United States Patent [19]
Skoyles

[11] 3,871,716
[45] Mar. 18, 1975

[54] ANTI-LOCK VEHICLE BRAKE SYSTEMS

[75] Inventor: Derek Robert Skoyles, Salford, United Kingdom

[73] Assignee: U.S. Philips Corporation, New York, N.Y.

[22] Filed: May 30, 1973

[21] Appl. No.: 365,220

[30] Foreign Application Priority Data
June 19, 1972 United Kingdom............... 28584/72

[52] U.S. Cl.............. 303/21 F, 303/68, 181/181 A
[51] Int. Cl............................................... B60t 8/06
[58] Field of Search............. 303/21 F, 6 C, 61–63, 303/68–69; 188/181 A

[56] References Cited
UNITED STATES PATENTS
3,724,914  4/1973  Skoyles............................. 303/21 F FOREIGN PATENTS OR APPLICATIONS
2,112,091  9/1971  Germany.......................... 303/21 F
1,915,704  10/1970  Germany.......................... 303/21 F Primary Examiner—George E. A. Halvosa
Assistant Examiner—Jesus D. Sotelo
Attorney, Agent, or Firm—Frank R. Trifari

[57] ABSTRACT

An anti-lock brake system including fluid flow apparatus including a flow measuring piston having a flow restrictor limiting flow of fluid from one side of the piston to the other side. One side thereof is exposed to inlet pressure and one side to outlet pressure. A spring biases the piston in one direction and a separate spring is provided to bias the piston in the opposite direction.

13 Claims, 5 Drawing Figures

ANTI-LOCK VEHICLE BRAKE SYSTEMS

THIS INVENTION relates to anti-lock brake systems for wheeled vehicles, that is, brake systems including means for improving braking performance of a vehicle by relieving braking pressure applied to a road wheel of the vehicle if the wheel tends to lock following brake application and then increasing the braking pressure again without the need for any change in the actual braking action (by a person using the brake) causing the brake application. Such brake systems can be successful in reducing the risk of skidding due to wheel lock and in maintaining directional control during braking, and can also reduce braking distances.

In U.S. Pat. No. 3,608,984 there is described and claimed an anti-lock vehicle brake system which includes, a fluid pressure line for connection from a fluid pressure source to a wheel brake controlled by the system, an elongate slide member arranged for longitudinal movement into a section of said line, which member is so dimensioned as to provide between itself and the inner wall of the section a clearance which forms a restricted fluid path in said section, and means for varying the extent of penetration of said slide member into said section during operation of the system to cause variation of the length of said fluid path and thus of the restriction afforded by it.

In a practical embodiment of the invention of our above-identified patent specification, the diametral clearance between the slide member and the inner wall of said section is typically only 0.00075 inch, or approximately 19 microns, for a section diameter of 7mm., so that the restricted fluid path has a very thin annular cross-section. It can be shown that fluid flow rate $(q)$ through such a path is proportional to $d^3 P/\rho L$, where $d$ is the diametral clearance, P is the difference in fluid pressure at opposite ends of the path, L is the path length (i.e. extent of slide member penetration), and $\rho$ is the viscosity of the fluid. From the above equation it can be seen that not only will change in path length L change the fluid flow rate $(q)$ through the path (which change is controllable and intended), but that change in viscosity $\rho$ of the fluid will also affect the fluid flow rate $(q)$. It is well known in the automotive art that the viscosity of commercially available brake fluid varies considerably with variation in temperature. For example, a brake fluid having a kinematic viscosity of 20 centistokes at 25°C can have a kinematic viscosity of below 2 centistokes at 100°C and a kinematic viscosity greater than 200 centistokes at −20°C. An ambient temperature of −20°C is not uncommon in winter and brake fluid can easily reach a temperature of 100°C under normal braking conditions due to heat generated at a brake during braking. Therefore, this variation in the viscosity of brake fluid can result in different fluid flow rates at different temperatures for a given slide member penetration, so that anti-lock braking performance may be degraded below optimum.

It is an object of the present invention to provide for an anti-lock vehicle brake system a fluid flow control arrangement which can afford, between a fluid pressure source of the system and a wheel brake, a restricted fluid path the restriction of which can be varied to vary the flow rate of fluid therethrough, with the flow rate being appreciably less dependent on the viscosity of the fluid as compared with flow rate of fluid through the restricted fluid path afforded by the invention of our above-identified patent specification.

According to the present invention such a fluid flow control arrangement comprises a fluid path, including a metering orifice, for the flow of fluid between inlet and outlet ports of the arrangement, a displaceable flow-measuring piston across which a fluid pressure difference can be established due to the restriction of said metering orifice to such flow of fluid in the fluid path, said fluid pressure difference providing a force tending to displace said flow-measuring piston into sealing engagement with said outlet port, a fluid pressure equalizing path for applying fluid pressure at said outlet port to an equalizing area at the side of said flow-measuring piston remote from said outlet port which equalizing area is isolated from fluid pressure at said inlet port, and spring means providing a force tending to displace said flow-measuring piston away from said outlet port in opposition to the force due to said fluid pressure difference, whereby the flow rate of fluid into said outlet port is a function of the force of said spring means and the cross-sectional area of the metering orifice, the arrangement further comprising means for varying the force of said spring means so as to vary the flow rate of fluid into said outlet port.

In carrying out the invention, it is preferable that the metering orifice provides as short a fluid path length as possible in order to minimise fluid "drag", which will increase with increase of viscosity of fluid, on the wall bounding and defining the orifice. For practical purposes, therefore, said metering orifice may be considered to be what will be termed an "edge orifice", that is, an orifice bounded and defined by an edge of material, as distinct from a wall, which provides a minimal fluid path length through the orifice.

The metering orifice may be formed in or comprise an aperture which extends through the width of the flow-measuring piston. Alternatively, the metering orifice may be provided in a by-pass connection which forms part of the fluid path and which communicates with a chamber in which the flow-measuring piston is accommodated at opposite sides of the latter.

Said equalizing area at the side of the flow-measuring piston remote from said outlet port may be the same size as the cross-sectional area of the outlet port, in which case the respective forces exerted by the balanced fluid pressures at the said area and an area of corresponding size at the outlet port side of the flow-measuring piston will be the same and thus cancel out. Alternatively, the said area may be made of greater or less size than the cross-sectional area of the outlet port, in which case the force exerted by said spring means will be opposed or aided, respectively, by a further force, so that the flow rate of fluid into said outlet port is now partially determined by the value of fluid pressure across the flow-measuring piston. The fluid pressure equalizing path may be provided as an orifice extending through the flow-measuring piston.

In a preferred application of a fluid flow control arrangement according to the invention, as will be described, the arrangement is included in an anti-lock vehicle brake system in a fluid pressure connection extending between a fluid pressure source and a wheel brake controlled by the system and the force exerted by said spring means is varied as a function of the volume of fluid displaced through an actuated anti-lock control valve of the brake system, so as to provide a control on the rate at which braking pressure, which is produced by the flow of fluid through said fluid path, is reapplied at the end of an anti-lock action.

This may be achieved by including in the arrangement a second displaceable piston which is arranged for displacement by such displaced fluid to an extent determined by the volume thereof to reduce the force exerted by the spring means as a function of its extent of displacement. Preferably, displacement of said second piston causes a first spring to apply to the flow-measuring piston a force that is in opposition to the force applied to the flow-measuring piston by a second spring which opposes the force due to said fluid pressure difference, said first and second springs comprising said spring means.

With a fluid flow control arrangement according to the invention as so far described, the maximum fluid flow rate between the inlet and outlet ports is determined by the size of the metering orifice and the maximum force that the spring means can exert on the flow-measuring piston in opposition to the force due to said fluid pressure difference. Whereas a maximum fluid flow rate as thus determined can be made sufficient to provide the maximum rate at which braking pressure is re-applied at the end of an anti-lock action, it may be less than the flow rate required to achieve maximum braking efficiency during initial application of braking. Therefore, as an important modification, the arrangement may also include, when said fluid pressure equalizing path is provided as an orifice extending through the flow-measuring piston, as aforesaid, a sealing and balancing member which is located at the side of the flow-measuring piston remote from said outlet port and has a seal bounding the orifice at that side, an aperture communicating with said orifice within the seal boundary and an equalizing area bounding said aperture and replacing the equalizing area of said flow-measuring piston, the arrangement being such that at the onset of flow of fluid through said fluid path the flow-measuring piston will separate from the sealing and balancing member to permit fluid flow through said orifice between the inlet and outlet ports, said member being subsequently urged into engagement with the flow-measuring piston, so that the orifice is sealed by said seal, at the onset of fluid flow control. Where said spring means comprises said first and second springs, the force of said first spring due to displacement of said second piston effects this engagement.

A fluid flow control arrangement with a second displaceable piston as aforesaid, has a particular but non-exclusive application in an anti-lock vehicle brake system of the character comprising, for use in conjunction with a vehicle wheel and associated wheel brake, a fluid pressure source which in response to a braking action provides fluid under pressure via a fluid pressure connection to the brake, said fluid under pressure being effective to cause the brake to produce braking pressure at said wheel, an anti-lock control valve comprised by a solenoid valve mechanism, an electronic control circuit responsive to an electrical input from a wheel movement sensor to produce an electrical output to actuate the anti-lock control valve when a particular criterion related to wheel rotational movement obtains, a relief connection interconnected with said fluid pressure connection or with the brake and adapted to be opened by said anti-lock control valve, when the latter is actuated, to allow displacement of fluid from said fluid pressure connection or from the brake into said relief connection whereby to cause a reduction in the pressure of such fluid and thereby relieve braking pressure, and fluid flow control means for controlling as a function of the fluid displaced into said relief connection the rate at which braking pressure is increased again following closure of the anti-lock control valve. A preferred criterion for causing actuation of the anti-lock control valve is when percentage wheel slip exceeds a chosen value. In such an application, the fluid flow control arrangement would comprise said fluid flow control means, being included in said fluid pressure connection and having said second piston arranged for displacement to an extent which is a function of the volume of fluid displaced into said relief connection.

An anti-lock vehicle brake system of the above character may be either of the master cylinder type in which fluid in a master cylinder is pressurised by a piston, when a braking action takes place, to pressurise fluid in said fluid pressure connection, or of the continuously pumped type in which fluid under pressure is available continuously in the brake system and is "modulated" by a braking action such that the pressurised fluid is applied through said fluid pressure connection to the brake to an extent determined by the extent of modulation. Also, the braking action causing movement of the master cylinder piston or of the brake modulator, as the case may be, may be with or without servo or amplifier assistance. Having regard to the above, the term "fluid pressure source" as used in this specification is to be construed accordingly.

A separate system of the above character (with a common fluid pressure source) can be provided in respect of each road wheel of a vehicle, but it would also be possible to provide a single system for two (rear) wheels driven by a vehicle transmission shaft with a sensor associated with the shaft for producing the electrical signal related to wheel rotational movement. As another alternative, a single system may be provided in common for all the road wheels of a vehicle. In this case, each road wheel would have its own wheel movement sensor and associated control circuit, and any of the latter would provide an electrical output to actuate the anti-lock control valve when the appertaining wheel tends towards a locked condition.

In order that the invention may be more fully understood reference will now be made, by way of example, to the drawings of which:

Figure 1:
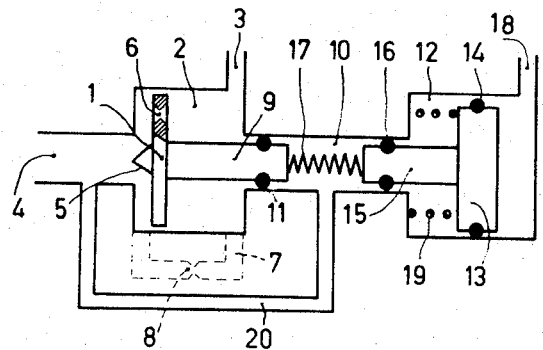
FIG. 1 shows diagrammatically a fluid flow control arrangement according to the invention.

Referring to FIG. 1 of the drawings, the fluid flow control arrangement there shown comprises a flow-measuring piston 1 which is slidably accommodated in a chamber 2. The chamber 2 has an inlet port 3 through which fluid under pressure can enter the chamber 2, and an outlet port 4 through which fluid leaves the chamber 2. The piston 1 has a valve seal 5 which could effect a fluid seal between the chamber 2 and the outlet port 4 if the piston 1 were urged fully to the left (as seen in the drawing). A metering orifice in the form of an edge orifice 6 is formed through the width of the piston 1 to permit passage of fluid through the chamber 2 from the inlet port 3 to the outlet port 4. Alternatively, passage of fluid between the inlet port 3 and the outlet port 4 may be by way of a by-pass connection 7, as shown in dotted lines, which includes therein a metering orifice in the form of an edge orifice 8. The piston 1 has a stem 9 which extends into a bore 10, an O-ring 11 providing a fluid seal between the wall of the bore 10 and the stem 9. There is provided in a second chamber 12 a second piston ring 13 which is freely slidable therein. An O-ring 14 provides a fluid seal between the wall of the chamber 12 and the piston 13. A stem 15 of the piston 13 extends into bore 10 and an O-ring 16 provides a fluid seal between the wall of the bore 10 and the stem 15. A spring 17 located in the bore 10 is secured at one end to the stem 9 of piston 1 and at the other end to the stem 15 of piston 13. This spring 17 is in tension and acts to tend to pull the piston 1 to the right. An inlet port 18 permits passage of fluid into the secnd chamber 12. A spring 19 biases the piston 13 to the right (as seen in the drawing). A second by-pass connection 20 interconnects the bore 10 with the outlet port 4. The operation of this fluid flow control arrangement is as follows.

Fluid entering the chamber 2 through the inlet port 3 flows past the piston 1 via the edge orifice 6 (or the by-pass connection 7 and edge orifice 8, as the case may be) to the outlet port 4. This flow of fluid produces across the piston 1 a fluid pressure difference which produces a force acting on the piston 1 in opposition to the force exerted by the spring 17. When the flow rate of fluid past the piston 1 has a value at which the fluid pressure difference across the piston 1 produces a force which exceeds the force exerted by the spring 17, the piston 1 is displaced to the left to tend to close the outlet port 4 with the valve seal 5. As a result, the flow rate of fluid past the piston 1 lessens and there is a consequential drop in the fluid pressure difference across the piston 1, so that the spring 17 tends to pull the piston 1 to the right again until a state of equilibrium is reached in which the piston 1 is maintained in a position in which the force exerted by the spring 17 is balanced by the force produced by the fluid pressure difference across the piston 1. Thus the rate of flow of fluid into the outlet port 4 has a value which is determined by the force exerted by the spring 17 and by the cross-sectional area of the orifice 6. In order that the fluid pressure at the outlet port 4 does not affect this state of equilibrium, a fluid pressure equalizing path 20 is provided so that this outlet port pressure is balanced by an equivalent fluid pressure in the bore 10. However, the respective forces exerted by the balanced fluid pressures in the bore 10 and the outlet port 4 are the same, and thus cancel out each other, only if the cross-sectional area of the bore 10 is the same as that of the outlet port 4. If these areas are not the same then the force exerted by the spring 17 will be aided or opposed by a further force depending on whether the cross-scetional area of the outlet port 4 is smaller or greater than that of the bore 10. As a result, the equilibrium position of the piston 1, and thus the flow rate of fluid into the outlet port 4 is now partially determined by the value of fluid pressure at the outlet port 4.

For equilibrium, the forces acting on the piston 1 can be represented by the equation:

$$P1A1 + P3(A2 - A1) + FS = P1A3 + P2(A2 - A3) \quad (1)$$

where $P1$ = the fluid pressure at the outlet port 4.
$P2$ = the fluid pressure at the inlet side of the piston 1.
$P3$ = the fluid pressure at the outlet side of the piston 1.
$A1$ = the cross-sectional area of the outlet port 4.
$A2$ = total area (including stem 9) at each side of the piston 1.
$A3$ = the cross-sectional area of the bore 10.
$FS$ = the force exerted by the spring 17.

Equation (1) can be re-written as:

$$P2(A2 - A3) - P3(A2 - A1) = P1A1 - P1A3 + FS \quad (2)$$

If $A3 = A1$, equation (2) becomes $$P2 - P3 = FS/(A2 - A1) \quad (3)$$

Therefore, the flow rate ($q$) of fluid at the outlet port 4 is proportional to $\sqrt{FS}$, since the flow rate of fluid through an edge orifice is proportional to the difference in fluid pressure across the orifice. The viscosity ($\rho$) of the fluid has a minimal affect on the flow rate.

If $A3 \neq A3$, then $q \alpha \sqrt{P1(A1 \pm A3) + FS} \quad (4)$

From equation (4), it can be seen that the flow rate of fluid at the outlet port 4 is now affected by the fluid pressure thereat.

With the fluid flow control arrangement of FIG. 1 as so far described, there is only one flow rate of fluid at the outlet port 4. However, this flow rate can be varied, between limits, by varying the force exerted by the spring 17. The piston 13 is provided to vary this spring force as a function of fluid volume in the chamber 12. Normally, the piston 13 is urged to the right by the force exerted thereon by the spring 19. The spring 19 is much stronger than the spring 17 so that the latter is maintained at maximum tension at this time. When fluid enters the chamber 12 via the inlet port 18 the piston 13 is urged progressively to the left as the volume of fluid in the chamber 12 increases to overcome the force exerted by the spring 19. As a result, the tension of spring 17, and thus the force exerted thereby, is reduced, so that the flow rate of fluid at the outlet port 4 is reduced in proportion to the square root of the reduced force of spring 17.

Figure 2:
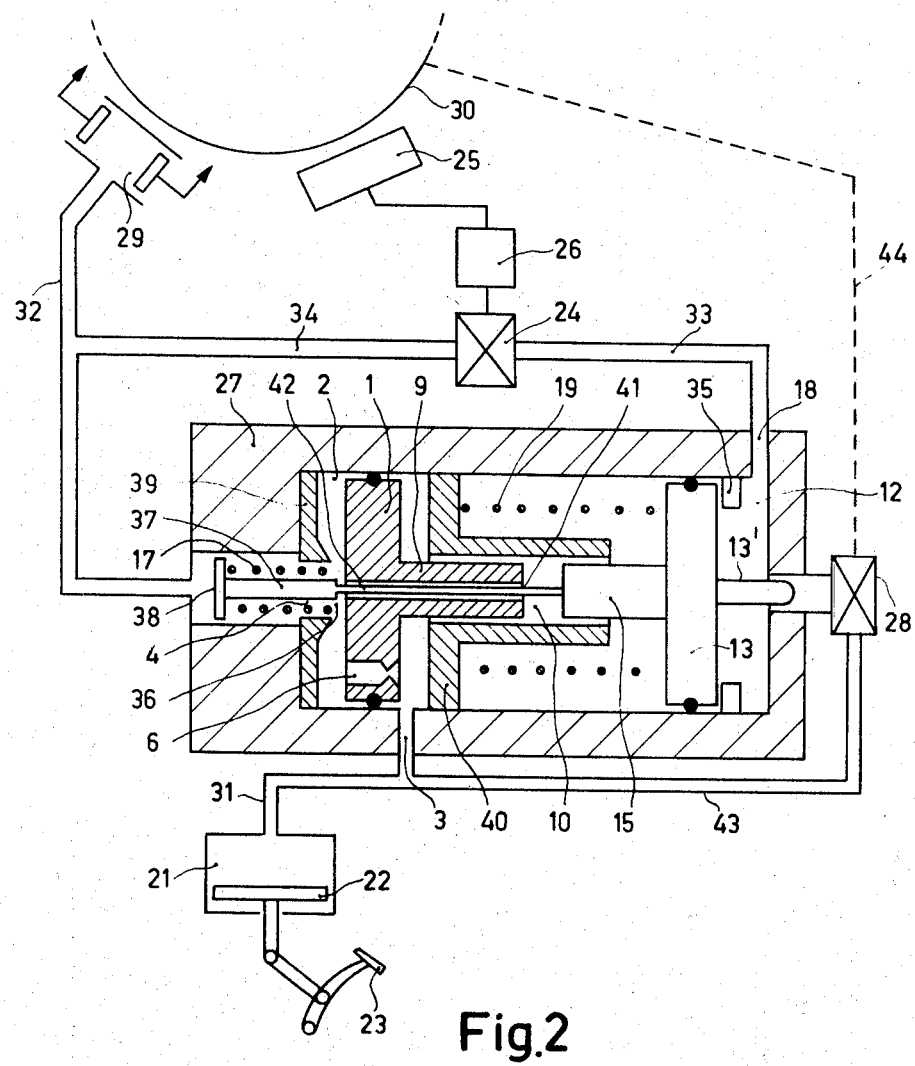
FIG. 2 shows diagrammatically an anti-lock vehicle brake system of the character referred to in which a practical form of fluid flow control arrangement according to the invention is incorporated.

Turning now to FIG. 2, the anti-lock vehicle brake system there shown is of the character previously referred to and is a master cylinder type hydraulic system comprising a master cylinder 21 having a piston 22 which is actuable by a brake pedal 23. The system further comprises a solenoid valve mechanism 24, a wheel movement sensor 25, a control circuit 26 a fluid control arrangement 27, and a scavenging pump 28. A vehicle brake 29 for a wheel 30 is controlled by the system. A similar system may be provided for each road wheel of a vehicle, with the master cylinder 21 being common to each system.

In operation of the system of FIG. 2 for normal brake application, fluid in pressure lines 31 and 32 is pressurised by the master cylinder 21 to an extent determined by a driver's braking action and this produces braking pressure in the brake 29. If the driver's braking action results in a precentage wheel slip above the estimated optimum value, this is detected by the wheel movement sensor 25 and the control circuit 26, and the solenoid valve mechanism 24 is energised by the control circuit 26. Details of the manner of the operation and the composition of the wheel movement sensor 25 and the control circuit 26 are not thought to be necessary for an understanding of the present invention, but an example is given in U.S. application Ser. No. 272,776, filed July 18, 1972. Another form of control circuit is described in U.S. Pat. No. 3,770,186. Also, the specific form of anti-lock vehicle brake system shown in FIG. 2, but incorporating a variable restrictor element as a fluid flow control arrangement, is described in greater detail than herein in our U.S. Pat. No. 3,734,914.

As a result of the energisation of the solenoid valve mechanism 24, a fluid path is opened by the latter between a relief connection 33 and the pressure line 32 (via line 34), so that some of the fluid under pressure in the pressure line 32 is displaced from the brake 29 into the relief connection 33, and braking pressure is relieved. This displaced fluid passes via the relief connection 33 and the inlet port 18 of the arrangement 27 to the chamber (or reservoir) 12 of the arrangement 27. (For the sake of simplicity, the elements of the arrangement 27 have been given the same reference numerals as their counterparts in FIG. 1). The fluid entering the chamber 12 displaces the piston 13 to the left. In the quiescent condition of the arrangement 27, the piston 13 is urged against a limit stop 35 by its biasing spring 19. In this position of the piston 13, a shoulder 36, which is formed on a spindle 37 that is secured to the piston 13, maintains the piston 1 in a position in which the outlet port 4 is maintained fully open so that the initial application of braking pressure is not impeded. The spring 17, in this arrangement a compression spring, is located between the piston 1 and an end flange 38 of the spindle 37. Thus, as the spindle 37 is moved to the left due to movement of the piston 13 to the left as the volume of fluid in the chamber 12 increases, the spindle shoulder 36 disengages from the piston 1 so that the latter is now urged to the right only by the force of spring 17. The compression of the spring 17, and thus its spring force, is a function of the displacement of the piston 13, which in turn is a function of the volume of fluid in chamber 12, as aforesaid. In the arrangement 27, the orifice size of the outlet port 4 is defined by an annular member 39 and the bore 10 is defined by a flanged annular member 40. A central bore 41 through which the narrow portion 42 of the spindle 37 passes freely, forms the bypass connection (20 - FIG. 1) between the bore 10 and the outlet port 4. The stems 9 and 15 of the pistons 1 and 13, respectively, are a close, but free-sliding, fit in the bore 10 to minimise leakage of fluid through the bore 10 from chamber 2. Thus, the provision of O-rings on these stems has been found to be unnecessary and, in fact, is undesirable since they tend to impair the free-sliding movement of the pistons 1 and 13.

Figure 3:
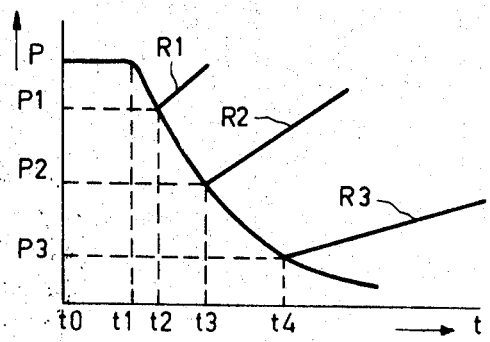
FIG. 3 shows brake pressure/time curves which are illustrative of the operation of the system of FIG. 2.

Once the solenoid valve mechanism 24 has been energised, braking pressure is reduced to an extent determined by the time that this mechanism is held energised by the control circuit 26. For normal anti-lock operation, the mechanism 24 is held energised for only a time sufficient to allow the braking pressure to fall sufficiently low for the wheel to recover towards free rolling speed. For example, as illustrated in FIG. 3, for a surface affording a high-co-efficient of friction (e.g. $\beta$=0.9) between itself and vehicle wheel, braking pressure would fall only to a value P1 over a short solenoid energisation period $t1 - t2$, whereas it would fall to a lower value P2 over a longer solenoid energisation period $t1 - t3$ for a surface for which say, $\beta$=0.5, and it would fall to an even lower value P3 over an even longer solenoid energisation period $t1 - 14$ for a surface for which, say, $\beta$=0.2.

When the solenoid valve mechanism 24 is subsequently de-energised to close the fluidpath between the relief connection 33 and the line 34, the pump 28, which is returning fluid from the chamber 12 to the pressure line 31 via a pressure line 43, gradually removes sufficient fluid from the chamber 12 for the piston 13 to be returned by the spring 19 to its position against the limit stop 35. As indicated by the broken line 44, the pump 28 can be driven by the wheel 30. The rate at which braking pressure can be re-applied to the brake following de-energisation of the solenoid valve mechanism 24 is determined by the final position of the piston 13 at the time of de-energisation. As illustrated in FIG. 3 by the slopes R1, R2 and R3 of the pressure curves, this rate decreases with increase inn solenoid energisation time, this being due to the fluid flow rate control of the arrangement 7 as a function of the volume of fluid displaced into the chamber 12. A restrictor pip 13' on the piston 13 permits a predetermined displacement (corresponding to a maximum flow rate into the outlet port 4) before the action of the pump 28 is inhibited to a low rate. Without this restrictor pip the flow rate may increase too rapidly towards the end of braking pressure build-up.

Figure 4:
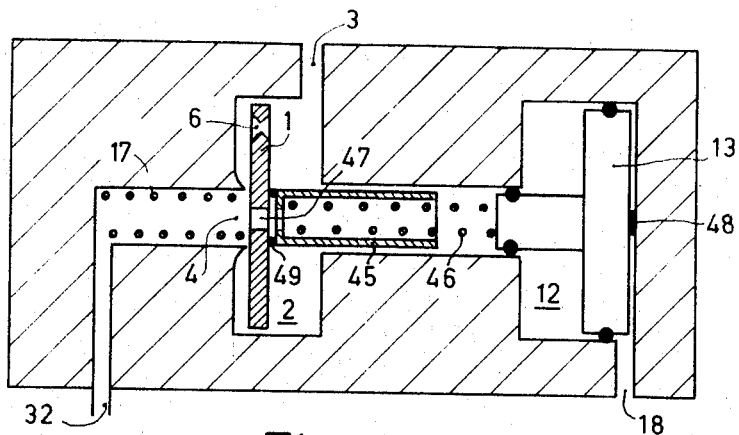
FIG. 4 shows another practical form of fluid flow control arrangement according to the invention.

The alternative fluid flow control arrangement shown in FIG. 4 comprises two pistons 1 and 13 in respective chambers 2 and 12, and has inlet ports 3 and 18 and an outlet port 4, as before. This alternative arrangement additionally comprises a separate flanged cylindrical member 45 (instead of piston stem 9), and a second spring 46 which acts on this member 45. Also, the piston 1 has a centre orifice 47. This alternative arrangement affords an improved flow rate ratio of the arrangement 27 in the system of FIG. 2 over the range of displacement of the piston 13. The arrangement of FIG. 4 has a specific application in an anti-lock vehicle brake system of the form shown in FIG. 2 in that its operation does not impede the initial application of braking pressure from the master cylinder (21) to the wheel brake (29). More specifically, when master cylinder pressure is applied at the inlet port 3, the fluid pressure difference produced across the piston 1 displaces the latter to the left with a force which is balanced by the force of spring 17, as before. However, in this arrangement, the member 45 is not moved at this time (spring 46 not being in compression when the piston 13 is in its inoperative position in engagement with a stop member 48 as shown), so that the piston 1 disengages from a fluid seal 49 on the member 45. As a result there is flow of fluid through the orifice 47 to the outlet port 4, so that braking pressure can build up at a greater rate than the maximum rate given by the force of spring 17, and the size of orifice 6. when anti-locking takes place, fluid displaced through the energised solenoid valve mechanism (24) enters the chamber 12 via inlet port 18 and piston 13 is displaced to the left in proportion to the volume of this fluid. This displacement brings the spring 46 under compression to produce a spring force which urges the member 45 towards the piston 1 so that the fluid seal 49 seals the orifice 47. Flow of fluid to the outlet port 4 is now by way of edge orifice 6 only and, thereafter, the flow rate of this fluid is determined by the force of spring 17 minus the opposing force of spring 46, which latter spring force is a function of the displacement of piston 13 as determined by the volume of fluid in the chamber 12. In this arrangement a restrictor pip which controls the rate of extraction of fluid from the chamber 12 by the pump (28) is unnecessary, because the initial path for fluid flow into the outlet port 4 via the orifice 47 permits the selection of a (smaller) edge orifice size to determine the maximum flow rate into the outlet port 4.

Figure 5:
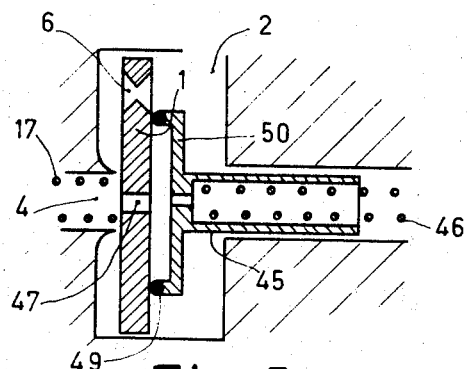
FIG. 5 shows a modification of the arrangement of FIG. 4.

In the modification shown in FIG. 5, the member 45 has an outwardly extending flange 50 which carries the fluid seal 49. The purpose of this flange 50 is to ensure that the fluid seal 49 maintains the bore 47 sealed once flow rate control begins. Without this flange 50 there might be a tendency for the orifice 47 to become unsealed when the spring 46 is at minimum compression. The presence of the flange 50 enables fluid pressure (i.e. master cylinder pressure) at the inlet port side of the chamber 2 to produce a force which urges member 45 towards the piston 1. This fluid pressure is also tending to displace the piston 13 (FIG. 4) towards its inoperative position so that the provision of a return spring (i.e. such as spring 19 in FIG. 2) is unnecessary. In the arrangement of FIG. 4 and also in modification of FIG. 5, the orifice 47 also serves for equalizing the fluid pressure at the outlet port 4 with an equivalent fluid pressure.

A weak spring (not shown) could be included between the piston 1 and the member 45 to urge these two parts away from each other in the absence of a force from spring 46. This would ensure unrestricted flow of fluid through orifice 47 for initial brake application.

What I claim is:

1. Fluid flow control apparatus comprising a housing having inlet and outlet ports, a metering orifice having a first side in fluid communication with said inlet port and a second axially spaced side in fluid communication with said outlet port, a flow-measuring piston carried by said housing for axial movement, with said piston having a first side in fluid communication with said inlet port and a second side in fluid communication with said outlet port, said piston modulating fluid flow upon axial movement thereof and shutting off all flow to said outlet in one axial position fluid outlet pressure never being more than the fluid inlet pressure and the fluid pressure difference across said piston providing a force tending to axially displace said flow-measuring piston into said one axial position, a fluid pressure equalizing path for applying fluid pressure at said outlet port to an equalizing area at the side of said flow-measuring piston remote from said outlet port which equalizing area is isolated from fluid pressure at said inlet port, spring means providing a force tending to displace said flow-measuring piston away from said outlet port in opposition to the force due to said fluid pressure difference, means for axially biasing said flow-measuring piston opposite to said spring means, said apparatus controlling the flow rate of fluid into said outlet port as a function of the force of said spring means and the cross-sectional area of said metering orifice.

2. Apparatus as claimed in claim 1, wherein said metering orifice is a sharp edged orifice.

3. Apparatus as claimed in claim 1 wherein said metering orifice is an aperture which extends through the width of the flow-measuring piston.

4. Apparatus as claimed in claim 1 wherein said metering orifice is provided in a by-pass connection which forms part of the fluid path and which communicates with a chamber in which the flow-measuring piston is accommodated at opposite sides of the latter.

5. Apparatus as claimed in claim 4, wherein said equalizing area at the side of the flow-measuring piston remote from said outlet port is the same size as the cross-sectional area of the outlet port.

6. Apparatus as claimed in claim 1 wherein said equalizing area at the side of the flow-measuring piston remote from said outlet port is of greater size than the cross-sectional area of the outlet port.

7. Apparatus as claimed in claim 6, including a second displaceable piston which is carried for displacement by a volume of fluid to reduce the force exerted by the spring means as a function of the displacement thereof.

8. Apparatus as claimed in claim 7, said spring means comprises a first spring applying to the flow measuring piston a force in one direction a second spring which opposes the force due to said fluid pressure difference, and said first spring, said second piston upon displacement in one direction increasing the force exerted by said first spring.

9. Apparatus as claimed in claim 8 wherein the fluid pressure equalizing path comprises an orifice extending through the flow-measuring piston.

10. Apparatus as claimed in claim 9, including a sealing and balancing member which is located at the side of the flow-measuring piston remote from said outlet port and has a seal bounding the orifice at that side, an aperture communicating with said orifice within the seal boundary and an equalizing area bounding said aperture said sealing and balancing member at the onset of flow of fluid through said housing being separated from the flow-measuring piston to permit fluid flow through said orifice between the inlet and outlet ports, and means for urging said member into engagement with the flow-measuring piston, so that the orifice is sealed by said seal, at the onset of fluid flow control.

11. Apparatus as claimed in claim 10, wherein said member has a seal that bounds the predominant portion of the side of the flow-measuring piston remote from the outlet port, said predominant portion not including the metering orifice aperture.

12. An anti-lock vehicle brake system having a fluid flow control apparatus as claimed in claim 11, further including a fluid pressure source and a wheel brake controlled by the system each in fluid communication with said apparatus, and a solenoid valve said means for biasing said flow measuring piston being responsive to the volume of fluid passing through said a solenoid valve.

13. The apparatus as described in claim 1 wherein said means for axially biasing said flow-measuring piston comprises a bias piston carried in said housing, said bias piston being axially movable in a direction generally aligned with the axis of said flow-measuring piston, said means for axially biasing further including a spring coupling said bias piston and said flow-measuring piston, and said means for axially biasing said flow-measuring piston urging said flow-measuring piston towards said outlet port in one axial position thereof.

* * * * *

UNITED STATES PATENT AND TRADEMARK OFFICE
CERTIFICATE OF CORRECTION

PATENT NO. : 3,871,716
DATED : March 18, 1975
INVENTOR(S) : DEREK ROBERT SKOYLES It is certified that error appears in the above-identified patent and that said Letters Patent are hereby corrected as shown below:

Section [30] Foreign Application Priority Data

"June 19, 1972   United Kingdom.........28584/72" should read

--June 19, 1972   United Kingdom.........28584/72
  May 11, 1973    United Kingdom.........28584/72--

Column 5, line 25, "secnd" should be --second--.

Signed and Sealed this

Twenty-ninth Day of March 1977

[SEAL]

Attest:

RUTH C. MASON
*Attesting Officer*

C. MARSHALL DANN
*Commissioner of Patents and Trademarks*